(12) United States Patent
Yung et al.

(10) Patent No.: US 7,540,200 B2
(45) Date of Patent: Jun. 2, 2009

(54) METHOD AND APPARATUS FOR FLUID FLOW TESTING

(75) Inventors: Tin-Woo Yung, Houston, TX (US); Scott T. Slocum, Houston, TX (US); Robert E. Sandstrom, Sugar Land, TX (US); Zhong Ding, Missouri City, TX (US); Leif Smitt, Lyngby (DK)

(73) Assignee: ExxonMobil Upstream Research Company, Houston, TX (US)

( * ) Notice: Subject to any disclaimer, the term of this patent is extended or adjusted under 35 U.S.C. 154(b) by 91 days.

(21) Appl. No.: 10/572,050

(22) PCT Filed: May 27, 2004

(86) PCT No.: PCT/US2004/016686

§ 371 (c)(1),
(2), (4) Date: Aug. 29, 2006

(87) PCT Pub. No.: WO2004/111605

PCT Pub. Date: Dec. 23, 2004

(65) Prior Publication Data

US 2007/0056384 A1  Mar. 15, 2007

Related U.S. Application Data

(60) Provisional application No. 60/502,718, filed on Sep. 12, 2003, provisional application No. 60/476,932, filed on Jun. 9, 2003.

(51) Int. Cl.
*G01N 3/00* (2006.01)
(52) U.S. Cl. ...................................... 73/807
(58) Field of Classification Search .......... 73/760–856, 73/807
See application file for complete search history.

(56) References Cited

U.S. PATENT DOCUMENTS 1,935,445 A  11/1933  Heinz ........................ 73/167

(Continued)

OTHER PUBLICATIONS

D. W. Allen and D. L. Henning, "Vortex-Induced Vibration Tests of a Flexible Smooth Cylinder at Supercritical Reynolds Numbers", Proceedings of the International Offshore and Polar Engineering Conference, vol. 3, 1997, pp. 680-685.

(Continued)

*Primary Examiner*—Max Noori
(74) *Attorney, Agent, or Firm*—ExxonMobil Upstream Research Company Law Department

(57) ABSTRACT

This invention relates generally to testing apparatus and methodology for measuring fluid dynamic properties of structures within fluid flows. One embodiment includes a fluid induced motion testing apparatus of the type which includes a test rig suitable for holding a test body in a fluid body. The apparatus may include any of an actuator suitable for producing a force upon the test body; a turbulence generator located in the fluid body up current from the test body suitable for generating a turbulent flow field with uniform turbulence intensity across the fluid body-test body interface, the turbulent flow field including dominate vortical structures, the axis of the vortical structures about parallel to the longitudinal axis of the test body; or a test body adjuster suitable for adjusting the test body relative to the fluid current in four or more increments, thereby enabling multiple headings of the test body to be tested against the current of the fluid body. This invention also relates to designing and constructing offshore structures and to producing hydrocarbon resources using offshore structures designed using the testing apparatus and methodology.

70 Claims, 8 Drawing Sheets

U.S. PATENT DOCUMENTS

| | | | |
|---|---|---|---|
| 3,242,782 A | 3/1966 | Reilly | 73/194 |
| 4,003,253 A | 1/1977 | Yard et al. | 73/194 VS |
| 4,069,708 A | 1/1978 | Fussell, Jr. | 73/194 VS |
| 4,196,621 A | 4/1980 | Beese et al. | 73/194 VS |
| 4,281,553 A | 8/1981 | Datta-Barua | 73/861.24 |
| 4,571,984 A | 2/1986 | Malcosky | |
| 4,727,756 A | 3/1988 | Lew | 73/861.24 |
| 4,902,629 A * | 2/1990 | Meserol et al. | 436/165 |
| 5,109,704 A | 5/1992 | Lew | 73/861.24 |
| 5,152,181 A | 10/1992 | Lew | 73/861.02 |
| 5,425,276 A * | 6/1995 | Gram et al. | 73/816 |
| 5,507,596 A | 4/1996 | Bostelman et al. | 405/191 |
| 5,869,772 A | 2/1999 | Storer | 73/861.24 |
| 6,349,664 B1 | 2/2002 | Brown et al. | 114/264 |
| 6,553,325 B1 | 4/2003 | Le Cunff | 702/56 |
| 6,871,840 B2 | 3/2005 | Peterson | 254/268 |
| 2002/0112858 A1 | 8/2002 | McDaniel et al. | 166/350 |
| 2002/0129661 A1 | 9/2002 | Clarke et al. | 73/861.22 |
| 2003/0097209 A1 | 5/2003 | Le Cunff et al. | 701/10 |
| 2003/0131777 A1 | 7/2003 | Fischer, III | 114/230.1 |
| 2004/0206187 A1 | 10/2004 | Williams | 73/766 |

OTHER PUBLICATIONS

M. J. Every, R. King, and D. S. Weaver, "Vortex-Excited Vibrations of Cylinders and Cables and Their Suppression", *Ocean Engineering*, vol. 9, No. 2, 1982, pp. 135-143, 145-157.

European Search Report No. 110248, dated May 12, 2003, for U.S. Appl. No. 60/502,718, 3 pages.

International Search Report and the Written Opinion of the International Searching Authority, mailed Aug. 11, 2005 for PCT/US04/16686, 8 pages.

International Preliminary Report on Patentability, mailed Dec. 29, 2005 for PCT/US04/16686, 5 pages.

PCT Written Opinion of the International Preliminary Examining Authority, mailed Mar. 10, 2006 for PCT/US04/16686, 6 pages.

* cited by examiner

METHOD AND APPARATUS FOR FLUID FLOW TESTING

CROSS REFERENCE TO RELATED APPLICATIONS

This application is the National Stage of International Application No. PCT/US04/16686, filed May 27, 2004, and claims the benefit of U.S. Provisional Application 60/476,932, filed Jun. 9, 2003 and U.S. Provisional Application 60/502,718, filed Sep. 12, 2003.

FIELD OF THE INVENTION

This invention relates generally to testing apparatus and methodology for measuring dynamic properties of structures within fluid flows. This invention also relates to designing and constructing offshore structures and to producing hydrocarbon resources using offshore structures designed using the testing apparatus and methodology.

BACKGROUND OF THE INVENTION

Offshore structures must be capable of withstanding forces from the ocean environment over the entire life of the structure. Wind, waves and currents are the principle sources of dynamic loading. Currents and wind are known for inducing structures into a vibratory motion, often referred to as Vortex Induced Vibration (VIV). This vibration is the result of the fluid (e.g. water and/or air) shedding in an alternating fashion from opposite sides of the structure. This alternating shedding of vortices creates an oscillatory pressure field in the fluid around the structure. Depending on the resistance of the structure, these forces can be large enough to induce movement of the structure. The rate of this shedding depends on the size of the structure and the speed of the fluid. As the shedding frequency approaches a natural vibration frequency of the structure, the oscillatory pressures can induce a resonant vibration on the structure. VIV places demands on strength and fatigue resistance of offshore structures.

Interest in VIV-induced motions of offshore structures and tow tanks with sufficient capability to test at the high Reynolds numbers necessary to be applicable for offshore applications have been present for more than twenty-five years. Yet, accurate prediction of full-scale behavior of offshore systems has remained elusive due to the inherent limitations in testing and analysis procedures used in the field to date.

The presently known methodologies for testing offshore structures for VIV motions may generally be classified into three categories. First there is testing in current flumes where the current flows past the test body. However for open channel testing, only low Reynolds numbers may be achieved and there is little control over the turbulence intensity level. For cavitation channel testing, which operates at higher than atmospheric pressure, the current design and implementation of test rigs do not allow for large amplitude oscillation at wide ranges of flow velocity.

Next, there is testing in tow tanks where the test body is towed through a long tank. This type of testing is normally hampered by mechanical damping effects resulting from the use of a test rig that holds the test body. Such mechanical damping effects are either ignored or improperly quantified in subsequent data processing. Furthermore, some testing is accomplished with a vertical test body which pierces the surface of the water fluid body. Tests where the test body is oriented vertically and pierces the water surface can generate waves and be unacceptable for high Reynolds number testing.

Then there is also forced oscillation testing methods where the test body is forced to oscillate at given frequencies and amplitudes. At high Reynolds numbers, the hydrodynamic force is large and is dominated by inertia effects that tend to overwhelm lift and damping forces. The relatively large inertia force coupled with components orders of magnitude smaller render measurement of the smaller forces difficult and inaccurate.

To summarize, available laboratory test set-ups and procedures have also been unable to consistently reproduce full scale observed behavior. Problems inherent to existing test rigs include the inability to properly account for mechanical damping in the test set-up, the inability to model free-surface wave effects and the inability to properly model turbulence. In addition, analytical methods for predicting VIV for the range of Reynolds number and complex geometries associated with typical offshore structures have proven to be inadequate. Embodiments of the VIV testing apparatus and procedures outlined herein are capable of reproducing observed full scale phenomena and provide a major improvement compared to other available test rigs and test methodologies.

SUMMARY OF THE INVENTION

One embodiment of the current invention includes a fluid induced motion testing apparatus of the type which includes a test rig suitable for holding a test body in a fluid body. In one embodiment of the invention the testing apparatus includes one or more of the following element(s). The element may be an actuator suitable for producing a force upon the test body; a turbulence generator located in the fluid body up current from the test body suitable for generating a turbulent flow field with uniform turbulence intensity across the fluid body-test body interface, the turbulent flow field including dominate vortical structures, the axis of the vortical structures about parallel to the longitudinal axis of the test body; or a test body adjuster suitable for adjusting the test body relative to the fluid current in four or more increments, thereby enabling multiple headings of the test body to be tested against the current of the fluid body.

An alternative embodiment of the invention includes a method for testing fluid induced motions using the testing apparatus described above and various other testing apparatus alternatives described herein. The method includes: a) providing a fluid body comprising a fluid; b) attaching a test body to a test rig of the testing apparatus; c) submerging the test body at least partially in the fluid body; and d) moving the test body, the fluid, or both thereby creating relative movement between the test body and the fluid.

An alternative embodiment of the invention includes a fluid induced motion testing apparatus. The apparatus including: a) a test body; b) a test rig suitable for holding the test body in a fluid body; and c) one or more of the following elements: 1) an actuator suitable for producing a force upon the test body; 2) a turbulence generator located in the fluid body up current from the test body suitable for generating a turbulent flow field with uniform turbulence intensity across the fluid body-test body interface, the turbulent flow field including dominate vortical structures, the axis of the vortical structures about parallel to the longitudinal axis of the test body; or 3) a test body adjuster suitable for adjusting the test body relative to the fluid current in four or more increments, thereby enabling multiple headings of the test body to be tested against the current of the fluid body.

An alternative embodiment of the invention includes a fluid induced motion testing apparatus. The testing apparatus including a test body and a test rig suitable for holding the test body in a fluid body. The testing apparatus characterized by the apparatus including one or more of the following elements: a) an actuation means suitable for producing a force upon the test body; b) a turbulence generation means located in the fluid body up current from the test body suitable for generating a turbulent flow field with uniform turbulence intensity across the fluid body-test body interface, the turbulent flow field including dominate vortical structures, the axis of the vortical structures about parallel to the longitudinal axis of the test body; c) a test body adjustment means suitable for adjusting the test body relative to the fluid current in four or more increments, thereby enabling multiple headings of the test body to be tested against the current of the fluid body; d) a non-linear spring means suitable for absorbing at least a portion of the forces imparted to the test body in a direction perpendicular to the fluid current, the non-linear spring means suitable for simulating the stiffness characteristic of an offshore structure represented by the test body; or e) a towing means suitable for transferring movement from a means of propulsion to the test body thereby moving the test body relative to the fluid body, said towing means including a towing strut pivotally connected to a towing rod, said towing rod connected to said test body, said towing strut connected to said means of propulsion, said towing means thereby providing a means for movement of said test body in a direction perpendicular to the fluid current, the ratio of the length of said towing rod to the average diameter of said test body being greater than 6.

An alternative embodiment of the invention includes a method for testing fluid induced motions using a testing apparatus. The method includes determining a flow regime range that is dynamically relatively consistent within such flow regime range. The method includes determining at least one Reynolds number within said flow regime range expected to be experienced by an offshore structure while in a body of water. The method includes providing a fluid body comprising a fluid. The method includes providing a test body, the test body being representative of the offshore structure. The method includes providing a testing apparatus suitable for holding the test body. The method includes attaching a test body to a test rig of the testing apparatus. The method includes determining a second Reynolds number within the flow regime range that is suitable for testing fluid induced motions using the testing apparatus, the second Reynolds number differing from the at least one Reynolds number. The method includes submerging the test body at least partially in the fluid body. The method includes moving the test body, the fluid, or both thereby creating relative movement between the test body and the fluid wherein the relative movement between the test body and the fluid approximates the second Reynolds number.

BRIEF DESCRIPTION OF THE DRAWINGS

FIG. 6b illustrates the turbulence bar screen performance of the turbulence screen of FIG. 6a.

DESCRIPTION OF THE INVENTION

Figure 1:
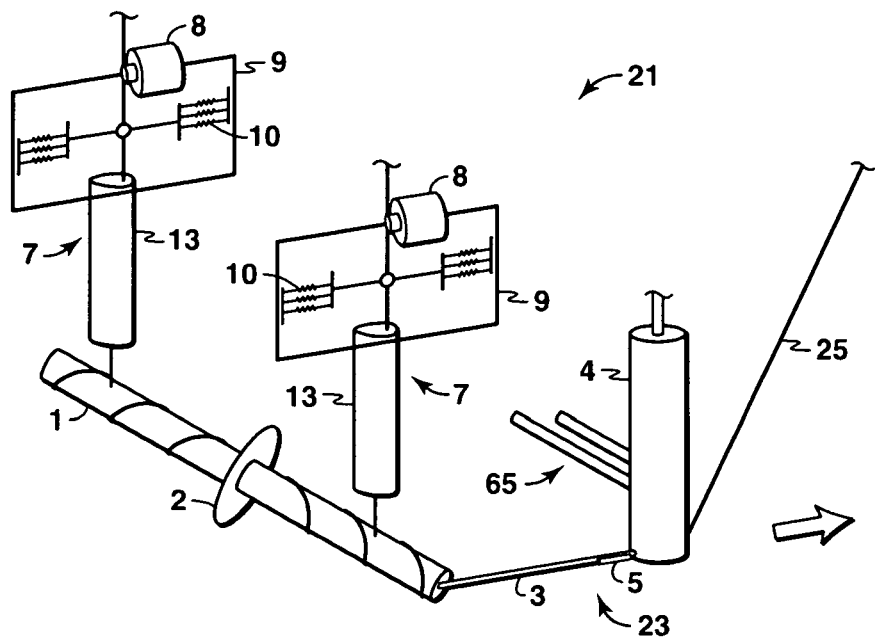
FIG. 1 illustrates one embodiment of a testing apparatus according to one embodiment of the invention.

As used herein and in the appended claims the phrase "test body" is meant to refer to any geometrically shaped structure which is able to be placed in a fluid body. A test body may, but does not have to be, a model scale representation of a larger structure that may, but does not have to be, an offshore structure. A test body may be any type of test body, for example any horizontal or vertical, single or double, divided or undivided, test body in any geometric shape. A test body may be capable of being completely submerged in the fluid body or partially submerged in the fluid body, depending on the specific requirement of the model test.

As used herein and in the claims the phrase "offshore structure" is meant to refer to any structure that may come into contact with a body of water. Examples of offshore structures, include, but are not limited to, floating structures, spars, tension leg platforms, drilling or production risers, pipelines, subsea structures and other structures used in the offshore petroleum industry.

As used herein and in the claims the phrase "fluid" is meant to refer to any type of fluid. Examples of fluids include, but are not limited to, water, air and mixtures thereof. The water may be pure or include other elements such as salts or minerals. The water may be salt water similar to water found in an ocean.

As used herein and in the claims the phrases "fluid current" or "water current" are meant to refer to any situation where the fluid or the test body moves relative to the other. For example a test body being dragged through a water test tank where the water within the test tank is relatively stationary or where the test body is stationary and the water is excited to flow in a current past the test body.

As used herein and in the claims the phrase "actuator" is meant to refer to any device which is capable of moving one member relative to another member. Examples of actuators include, but are not limited to, pistons, hydraulic systems, mechanical chain and sprocket assembles and mechanical screw assembles.

As used herein and in the claims the phrase "force measurement device" is meant to refer to any device that is capable of measuring a force. An example of a force measuring device is a load cell.

As used herein and in the claims the phrase "vertical motion sensor" is meant to refer to any type of sensor capable of measuring the movement of one member relative to another member or a reference point. Although the phrase vertical motion sensor includes the term "vertical" the sensor may measure motions in any direction, including a purely horizontal direction. The term vertical was applied to the defined phrase because the type of motion sensor used in the more common configuration, where a test body is moved in and relative to water horizontally, includes measuring vertical VIV motions induced in the test body perpendicular to the relative test body-fluid relative flow. A vertical motion sensor may be, but is not limited to, a linear variable differential transfer cells and/or a variable resistance transducer.

Embodiments of this invention relate generally to testing apparatus and methodology for accurately measuring hydrodynamic coefficients including, for example, lift, damping and added mass coefficients, and predicting current induced vibrational motions on offshore structures over a broad range of flow conditions (at differing speeds, directions and turbulence levels). The testing apparatus and methodology described herein may be used to predict hydrodynamic properties for offshore structures, such as, but not limited to, floating structures, spars, tension leg platforms, drilling or production risers, pipelines, subsea structures and other structures used in the offshore petroleum industry.

VIV places demands on the strength and fatigue resistance of offshore structures. The design for structures subject to VIV requires knowledge of the fluid loads (drag and lift) and the resulting structural response to those loads. Determination of the fluid loading depends on fluid properties (density, viscosity), flow conditions (speed, profile over the body, unsteadiness, turbulence, direction), body geometry (shape, configuration, length, roughness, appurtenances, orientation to flow), and body movement (flexible or rigid, amplitude, frequency). Non-dimensional parameters which can be used to characterize the hydrodynamic and dynamic characteristic properties of the VIV problem are the "Reynolds number" (current speed times body diameter divided by fluid kinematic viscosity) and "reduced-velocity" (current speed times natural period of oscillation divided by body diameter).

Embodiments of the testing apparatus and methodologies discussed herein are also capable of addressing VIV problems involving marine risers. Current riser VIV predictive tools require knowledge of sectional hydrodynamic coefficients such as lift, damping and added mass coefficients. By balancing mechanical damping with external actuator force and by balancing inertia forces with a spring system, this invention is capable of accurately measuring these coefficients at fullscale Reynolds number. Conventional methods using force oscillation tests to yield these coefficients has shown to be inaccurate and requires considerable safety margins for design.

The available prior art riser design hydrodynamic coefficients apply only at low Reynolds numbers. The testing apparatus and methodology described herein enable one to acquire coefficients for a broad range, including super critical Reynolds number flow conditions. This capability will reduce design uncertainty and associated costs.

Embodiments of this invention include one or more of several test rig innovations and associated methodology. These test rig innovations and methodologies may significantly improve tow tank model testing of VIV-induced motions on offshore structures. These innovations may be implemented in a test rig that is attached to a tow carriage which rides over the top of a long test tank to pull the test body through a fluid, for example, water. The innovations described herein may also be implemented on a test rig which remains stationary and the fluid current moves past the test body.

Referring now to FIG. 1 which depicts an overall schematic of one embodiment of the invention that includes many of the innovations described above. However, it is the claims appended hereto that define the scope of the multiple individual embodiments of the invention claimed herein. Neither FIG. 1, nor any other figure or description contained herein, should be considered a depiction of elements that all embodiments of the invention contain. To the contrary, it is the claims that define which elements described herein are included in a particular embodiment of the invention.

Test body 1 is depicted as a horizontal double test body including a divider plate 2 located in the center of the test body 1. The horizontal double test body is one particular type of test body 1 that may be used in some embodiments of the invention but other test bodies may also be used in embodiments of the invention. Any type of test body may be used with other embodiments of the invention, for example any horizontal or vertical, single or double, divided or undivided, test body in any geometric shape. The test body may be completely submerged in the fluid body or partially submerged in the fluid body, depending on the specific requirement of the model test. For example, in order to avoid problems inherent in other test rigs a horizontally oriented test body 1 can be deeply submerged in the fluid body, for example water, to avoid free-surface effects occurring at fluid body interfaces, for example, a water-air interface. In alternate embodiments of the invention the test body 1 is submerged at least 1 test body diameter below the fluid surface and at least 1 diameter from the fluid body bottom. In alternative embodiments the test body 1 is submerged at least 3 test body diameters below the fluid surface and at least 3 diameters from the fluid body bottom. In alternative embodiments the test body 1 is submerged at least 6 test body diameters below the fluid surface and at least 6 diameters from the fluid body bottom. The submerged horizontal double test body with a divider plate 2, simulating mirror images corresponding to the submerged portion of a floating structure, may be used in embodiments of the invention to simulate free surface effects, for example, the effect of an air-water interface on a surface-piercing floating offshore structure. A divider plate may be designed to prevent fluid transfer across the divider plate 2, thereby simulating a fluid interface (such as a water-air interface). The double test body allows for the additional benefit of redundant measurement on both sides of the model, which provides a check for data consistency. The double body configuration may also be used in conjunction with the divider plate 2 to provide a balanced system for measurement.

The test body 1 may be towed through a test tank through use of a towing assembly 23. The towing assembly 23 may be composed of a tow rod 3 and tow strut 4. Alternatively, multiple tow rods 3 may be used to connect the test body 1 to multiple tow struts 4 located upstream in the fluid. One end of tow rod 3 may be connected to the test body 1 while the other end may be connected to the tow strut 4. Tow strut 4 may also be attached to a towing carriage, not shown, which may be capable of moving the tow strut 4, and thus the test body 1 through the testing fluid. Alternatively, tow strut 4 may be attached to a fixed body and the fluid may be forced to flow past the stationary test body 1 and test rig 21. Alternatively, two tow rods 3 may be connected to opposite ends of test body 1. Alternatively, the tow rod 3 can be very long and may be pivotally connected to the tow strut 4 to enable the test body 1 to move freely in an almost vertical direction (i.e. perpendicular to the fluid flow) and oscillate nearly vertically (i.e. with a slight arc). In order to simulate near vertical motion of the test body in alternate embodiments of the invention the tow rod may be long. That is the tow rod may alternatively be greater than 2 meters, greater than 3 meters, greater than 4 meters, or greater than 5 meters. The tow rod may also be chosen from the ratio of the length of the tow rod to the diameter, or characteristic or average diameter, of the test body. In such a case the ration of the tow rod length divided by the test body diameter may alternatively be greater than 6, greater than 7, greater than 8, greater than 9, or greater than 10.

Tow rod 3 may include a tow rod force measuring device 5 to enable measurement of drag forces exerted upon the test body 1. The tow rod force measuring device 5 may be any device capable of measuring the drag force exerted upon the test body 1, for example, a load cell.

Test body 1 may also be attached to one or more push-pull assembles 7, discussed in more detail later herein. In such an arrangement one end of the push-pull assembly 7 may be attached to the test body 1 while the opposite end may be attached to a tow carriage or fixed body. In FIG. 1, the push-pull assembly 7 is partially encased in a drag reduction device 13, for example a fairing, to reduce the drag of the push-pull assembly 7 in the fluid body. The drag reduction device 13 may be absent or included in the various embodiments of the invention and when included may be any device which is capable of reducing the drag and disturbances generated by the push-pull rod.

In one embodiment the push-pull assembly 7 may alternatively be equipped with a spring assembly 9 which may be used to simulate the restoring characteristic of a mooring system used for some offshore structures. The spring assembly 9 may include one or more springs 10 which resist forces in the positive and/or negative direction perpendicular to the fluid flow direction (e.g. the vertical direction). Such a system may be used to enable simulation of structural and mooring stiffness common in offshore structures. One alternative configuration may use a horizontal spring set which deforms vertically (i.e. perpendicular to the fluid flow) to model non-linear mooring stiffness. Further, by adjusting the stiffness (number of springs or individual spring stiffness constant), multiple tests at the same reduced velocity but different Reynolds number can be carried out in order to assess the Reynolds number dependence and the scalability of the results.

The push-pull assembly 7 may alternatively also include an actuator 8 that may be used to apply forces to the test body 1 through the push-pull assembly 7. In one embodiment the actuator 8 is capable of applying positive or negative vertical forces (i.e. perpendicular to the fluid flow direction) to the test body 1 by transfer of such force through the push-pull assembly 7. The actuator 8 may be any device that is capable of applying a mechanical force to the test body 1 through a mechanical linkage. Examples of suitable actuators 8 include, but are not limited to, pistons, hydraulic systems, mechanical chain and sprocket assembles and mechanical screw assembles.

The push-pull assembly 7 may be attached to a suitable towing carriage, not shown, by attachment of the spring assembly 9, if included, or through another manner of attachment. There may be multiple push-pull assembles 7 attached to the test body 1 and the towing carriage as depicted in FIG. 1.

Figure 2:
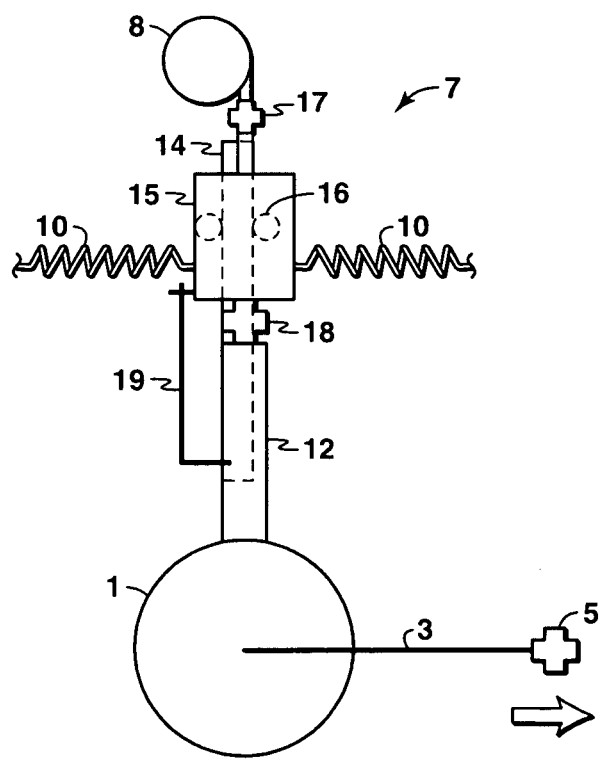
FIG. 2 illustrates one embodiment of a push-pull assembly and associated equipment according to one embodiment of the invention.

Referring now to FIG. 2, the push-pull assembly 7 may alternatively contain various constituent elements in different embodiments of the invention. The resistance of springs 10 of spring assembly 9 may be communicated to the push pull rod 12 through use of a track 14 and car 15 assembly. The springs 10 may be attached to the car 15, which may be slideably movable over the track 14 through use of wheels or bearings 16. The track 14 may be attached to, for example, the tow carriage or a stationary body. The car 15 may then be in communication with the push-pull rod 12. The track 14 and car 15 assembly is one particular method of communicating the spring 10 resistance to the test body 1, through the push-pull rod 12, however any device capable of performing such a function may be used instead of or as a complement to the track 14 and car 15 assembly. Vertical push-pull rods 12 may be connected to two or more points on the test body 1. The push-pull rods 12 may be connected to the test body 1 far enough apart in a horizontal direction so that the distance between an exterior push-pull rod 12 attachment point and the tow rod 3 connection point is sufficiently small so as to reduce any moment that may be induced in the test body 1 upon movement of the tow carriage. Actuator 8 may also be in communication with the car 15, thereby affording a means of communicating force added by the actuator 8 through the push-pull rod 12 to the test body 1.

In alternate embodiments the push-pull rod 12 may be manufactured of a light weight material so as to make the push-pull rod neutrally buoyant, nearly neutrally buoyant, or more than neutrally buoyant in the fluid body. In one embodiment the push-pull rod may be designed so that the combination of the push-pull rod and the test body are neutrally buoyant, nearly neutrally buoyant, or more than neutrally buoyant in the fluid body. In differing embodiments of the invention the push-pull rod may be from 0.5 to 1.5 times the density of the fluid body. In differing embodiments of the invention the push-pull rod may be from 0.75 to 1.25 times the density of the fluid body. In differing embodiments of the invention the push-pull rod may be from 0.90 to 1.10 times the density of the fluid body. In differing embodiments of the invention the average density of the combination of the push-pull rod and the test body may be from 0.75 to 1.25 times the density of the fluid body. In differing embodiments of the invention the average density of the combination of the push-pull rod and the test body may be from 0.85 to 1.15 times the density of the fluid body. In differing embodiments of the invention the average density of the combination of the push-pull rod and the test body may be from 0.95 to 1.05 times the density of the fluid body.

One embodiment of the testing rig 21 includes a force measurement system which is capable of measuring any one or combination of the forces imparted upon the test body 1 by the actuator 8, vertical (i.e. perpendicular to the fluid flow) forces imparted upon the test body 1 from movement of the test body 1 through the fluid, and drag forces imparted upon the test body 1 through movement in the fluid body. For example, an actuation force measurement device 17 may be placed on the track 14 beneath the actuator 8 in order to isolate and measure the force imparted by the actuator 8. A test body force measuring device 18 may be placed on the push-pull rod 12 above the connection point with the test body 1 and below the springs 10 in order to isolate and measure the vertical (i.e. perpendicular to the fluid current flow) forces induced upon the test body 1 through movement in the fluid body, for example from VIV. As previously discussed a tow rod force measuring device 5 may be placed on the tow rod 3 to enable measurement of drag forces exerted upon the test body 1. Additionally a vertical motion sensor 19 may be included on the push-pull assembly 7 to enable measurement of the amplitude of the vertical motion experienced by the test body 1, for example through VIV excitation. The various force measurement devices described herein may be any device capable of sensing the forces described herein, for example load cells. The vertical motion sensor 19 may be any type of sensor capable of measuring the vertical movement of the test body 1, for example linear variable differential transfer cells and/or variable resistance transducers.

The force measurement system and vertical motion measurement system described above may be configured to enable extraction of data useful for determining hydrodynamic coefficients required for engineering analysis. As previously discussed, the force measurement devices, for example load cells, may be placed in line with the tow rod to measure drag forces acting on the test body as a result of fluid current flow. In one embodiment, strategically located force gages above and below the spring and car assembly enables individual measurement of the actuator forces and the hydrodynamic forces below the spring. Such a system of multiple force gauges and/or vertical motion sensors may also be used to aid in control of any external forces applied during testing. Such external forces may be applied to the test body 1 through use of an actuator 8 as discussed herein.

In testing it may be desirable to reduce or eliminate the mechanical damping of the test body by the test rig support structure in order to enable a more accurate determination of the hydrodynamic force acting upon the test body. This approach may be accomplished by using the previously described vertical motion sensor and/or force measurement devices to control the actuator output. For example, the vertical motion sensor may be configured to provide input to an actuator motor (for example, attached to the top of the track) through use of associated control logic that may enable the actuator to add energy to the system to compensate for the effects of the mechanical damping due to the test rig. In effect the actuator is thereby controlled to add force that are equal and opposite to the mechanical damping forces. By adjusting the actuator input such that the hydrodynamic lift coefficient is zero (FIG. 3), such a system may make it possible to ensure that the VIV is a free oscillation, that is free of mechanical damping effects. By adjusting the above-described control logic the actuator may also be controlled to dampen the VIV in order to simulate mooring resistance. The control logic may also be adjusted to add more energy into the system to simulate forces imparted upon offshore structures by wind, waves or other environmental forces.

A base actuator feedback control mechanism may be derived to compensate for damping due to mechanical friction. This type of control mechanism is know as Coulomb damping. The implementation of various damping models, such as Coulomb, linear and quadratic damping, in the feedback control logic enables accurate measurement of lift, damping and the added mass coefficient of the test body. Since the large inertia force associated with high Reynolds number testing may be balanced by the spring system for a wide range of reduced velocities in one embodiment, only a relatively small actuator excitation force may be required to balance the mechanical damping. By placing the force gauges at strategic locations (FIG. 2), the lift, damping and added mass coefficients as functions of A/D, that is the motion amplitude divided by the test body diameter or characteristic diameter, can be measured or calculated accurately. In practice, a combination of different damping models may be used to yield lift coefficients at different values of A/D.

Figure 3:
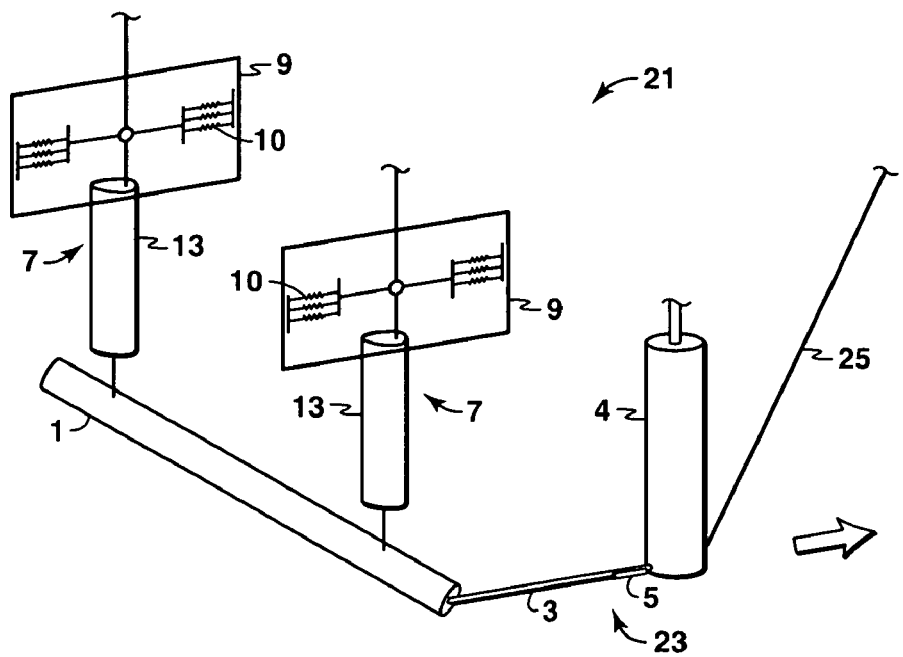
FIG. 3 illustrates a one embodiment of a testing apparatus according to one embodiment of the invention.
Figure 4:
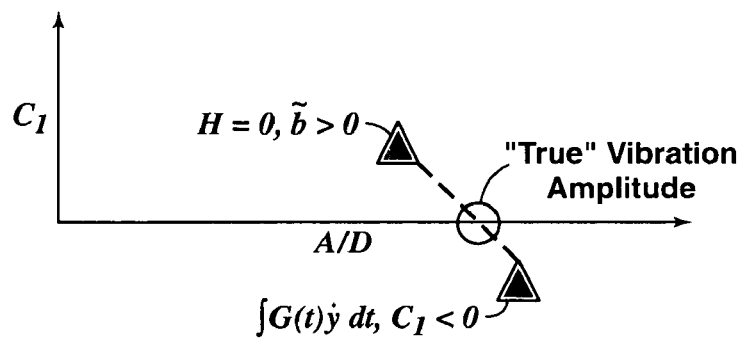
FIG. 4 illustrates a depiction of the lift coefficient versus motion amplitude.

FIG. 3 depicts an alternate embodiment of the invention which includes a spring assembly 9 and a horizontal test body 1. However, this embodiment does not include the actuator and turbulence bar screen depicted in FIG. 1. The test body 1 is also a more simplified test body that does not include a divider plate, nor the test body appendage details contained in FIG. 5.

Figure 6B:
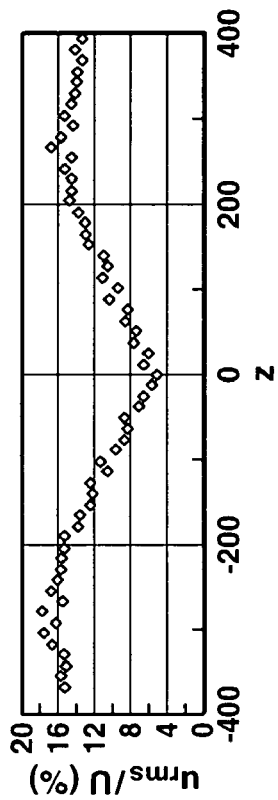
Figure 6D:
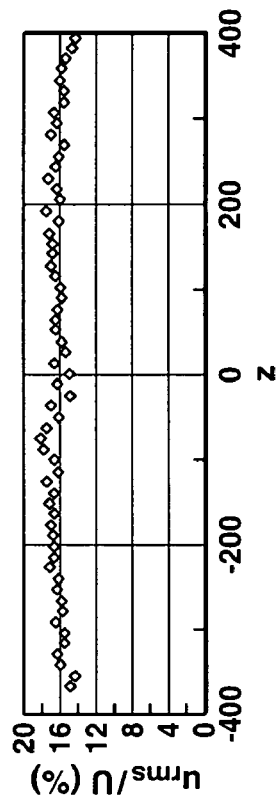
FIG. 6d illustrates the turbulence bar screen performance of the turbulence screen of FIG. 6c.
Figure 6A:
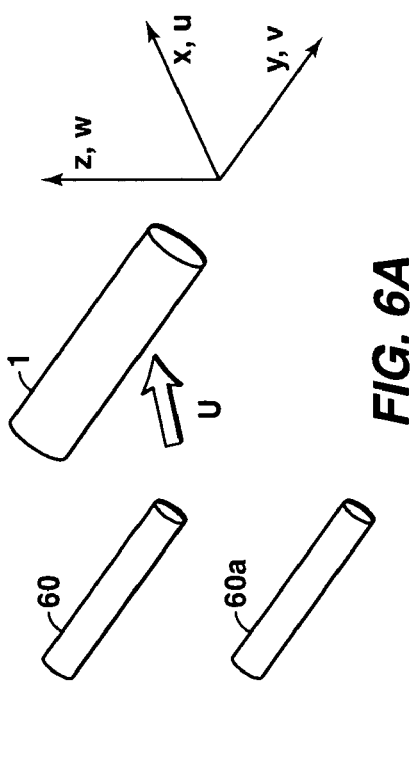
FIG. 6a illustrates one turbulence bar screen arrangement.
Figure 6C:
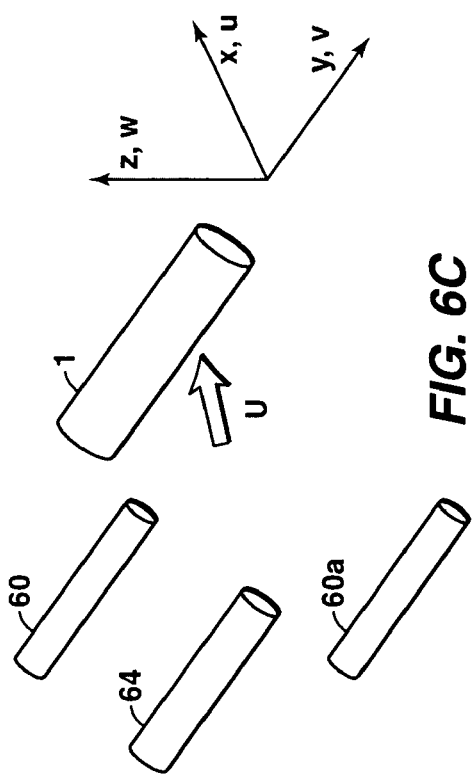
FIG. 6c illustrates another turbulence bar screen arrangement.
Figure 11:
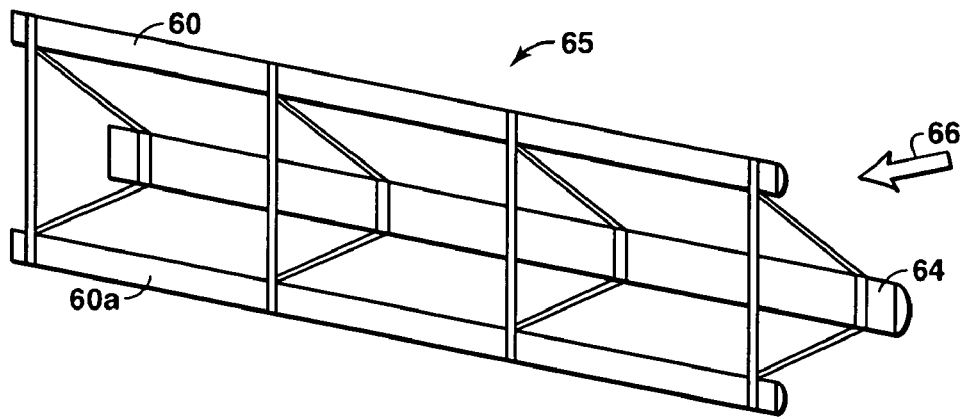
FIG. 11 illustrates one embodiment of a turbulence generator.

Returning now to FIG. 1, the test rig may be equipped with a means of producing turbulence in the fluid upstream of the test body 1. In FIG. 1 this means is depicted as a grouping of turbulence bars 65 attached to the tow strut 4. Other means of active/passive production of turbulence may be used, including, for example, an array of jets, a mesh screen, multiple patterned turbulence bars or other patterns of geometric bodies. A turbulence simulation system may be added to the testing apparatus to provide a means of evaluating the effects of turbulence on the VIV response of the test body. The turbulence simulation system may be designed to reproduce varying turbulence intensity levels and varying spatial distributions. In one embodiment, control of the turbulence characteristics is achieved through specification of the turbulence screen bar size, spacing relative to a vertical plane, and distance between the vertical plane and test body 1. For example, positioning of the turbulence bars as shown in FIG. 6*c* provides a means to produce turbulence intensity that is constant over the full range of motion expected by the test body 1 as it undergoes VIV oscillations. FIG. 6*a* displays two turbulence bars 60 and 60*a* placed upstream of the test body 1 with such turbulence bars longitudinal axis in the same vertical plane. In such a configuration the turbulence depicted as $U_{rms}/U$ is not uniform across the height of test body 1 as depicted by the Z axis graph on FIG. 6*b*. $U_{rms}$ is the root mean square of the test body velocity relative to the fluid body. U is the velocity of the test body relative to the fluid up current of any turbulence. U is, for example, the velocity of the tow carriage moving the test body through a stationary water test tank. In contrast when a third larger turbulence bar 64 is added to the previous configuration up current of the original turbulence bars 60 and 60*a* as depicted in FIG. 6*c* the turbulence regime is much more uniform across the height of the test body 1 as depicted in FIG. 6*d*. FIG. 11 provides a more detailed view of one embodiment of the turbulence generator. In one embodiment of the current invention the up current turbulence bar in the three bar configuration is from 1.1 to 3 times the diameter of the two down current turbulence bars. In an alternate embodiment, the up current turbulence bar is from 1.2 to 1.8 times the diameter of the two down current turbulence bars. In an alternative embodiment, the up current turbulence bar is about 1.5 times the diameter of the down current turbulence bars.

It has been found that a three turbulence bar arrangement, with a larger up current turbulence bar is effective in producing the type of turbulence existing in free ocean currents. Specifically free ocean currents include turbulence with dominant groups of vortices with a central axis about perpendicular to the ocean surface and about perpendicular to the current direction. These dominant vortices occur in the larger overall current and are carried with the current. In the case where the offshore structure is a spar, the vortices impact the spar hull as they are carried by the overall ocean current with the central axis of the vortices being about parallel to the central longitudinal axis of the spar. In modeling such a turbulence regime when a horizontal test body is used to represent a vertical spar structure, the vortices must be generated to have a central axis parallel to the central longitudinal axis of the horizontal test body. The above described three turbulence bar arrangement is able to produce dominant vortical structures, the central axis of which are parallel to the longitudinal axis of a horizontal test body, in order to simulate the turbulence regime experienced by vertical offshore structures in actual ocean currents. Many other prior art testing methods are inadequate for modeling and controlling turbulence, resulting in unacceptable VIV results.

Figure 12:
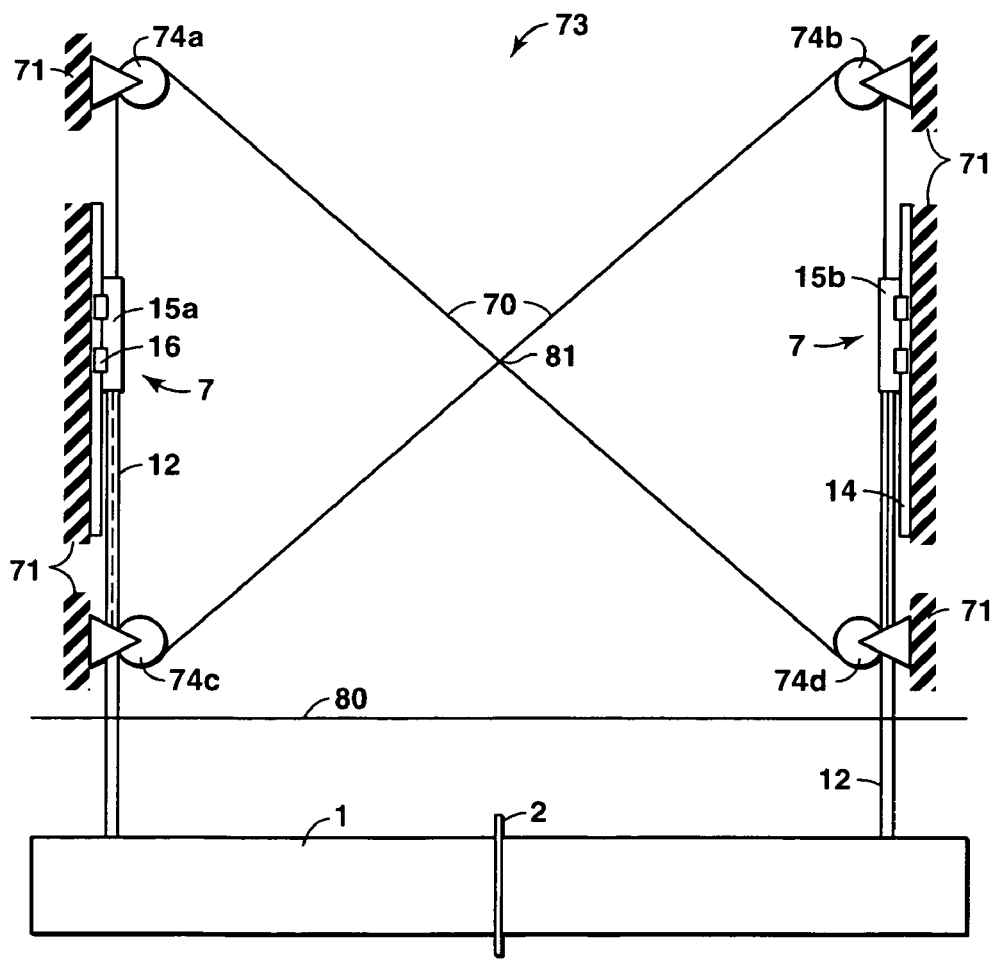
FIG. 12 illustrates one embodiment of a vertical displacement equalization system.

The test rig 21 may also be equipped with a vertical displacement equalization means in order to stabilize the test body 1, which may be effective in preventing the test body 1 from experiencing rotational motion in the vertical plane (i.e. a plane perpendicular to the fluid flow) in which the central axis of the test body 1 exists. Referring now to FIG. 12, a vertical displacement equalization system may be used to connect the respective push-pull assemblies 7, or extensions thereof, in order to reduce or prevent vertical motion of one push-pull assemblies 7 relative to another push-pull assemblies 7. In this manner the test body 1 may remain in a straight horizontal position. In one embodiment, a pantograph system 73 may be used to ensure the test body remains horizontal by securing the pantograph cable loop(s) 70 to multiple points on the tow carriage 71, or extensions thereof, to ensure that the test body 1 remains horizontal during testing. For example, the cable loop 70 may be slideably secured to the lower and upper ends of opposite sides of the tow carriage 71 by threading the cable loop 70 through pulley wheels 74 $a,b,c,d$ secured to the respective tow carriage 71 connection points. The pantograph system 73 may include one or more cable loops 70, secured to multiple points on opposite ends of the tow carriage 71 and may alternatively also be attached to the car 15 of the track 14 and car 15 system. When the cable loop 70 is attached to the car 15, the car 15 is effectively integrated into the cable loop 70. In this way a cross pattern is established by the cable loop 70 which remains in tension and thus provides resistance to rotational movement of the test body 1 in a vertical plane. In FIG. 12 the portion of the cable loop 70 between car 15$a$ and pulley wheel 74$c$ is depicted as a dotted line to show that the cable is located behind the push pull rod 12 as opposed to the portion of cable loop 70 between car 15$b$ and pulley wheel 74$d$ which is in front of the push pull rod 12. In this manner the cross point 81 of the loop 70 is centered over the center point of the test body 1.

In some testing applications it may be desirable to evaluate multiple headings of the test body into the fluid current. This may be desirable, for example, where a regular geometric body contains irregular appendages that may produce a non-uniform response depending on the heading of the test body into fluid flow. In order to accomplish multi-directional testing of a non-uniform test body, a sleeve with the non-uniform body appendages built onto it may be constructed to fit around a test body core. The sleeve may then be adjusted, for example by rotation around the test body core, to allow for efficient testing and fine control of heading dependent flows due to appendages on the test body. In alternative embodiments of the invention the sleeve may be adjusted in four or more, five or more, eight or more, or twelve or more increments, thereby enabling multiple headings of the test body to be tested against the current of the fluid body. In alternative embodiments of the invention the sleeve may be adjusted 20 degree, 15 degree, 10 degree, or 5 degree or less increments, thereby enabling multiple headings of the test body to be tested against the current of the fluid body.

Figure 5:
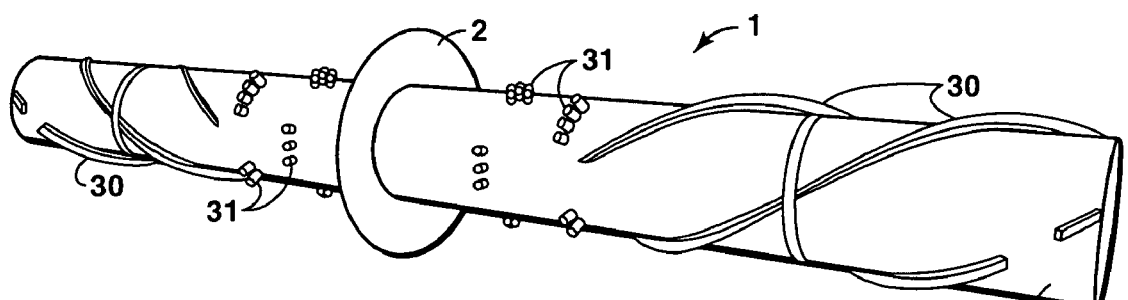
FIG. 5 illustrates one embodiment of a model that may be used in some embodiments of the invention.

Referring now to FIG. 5 depicting one embodiment of a test body 1 which is designed to be used as a horizontal double test body with a divider plate 2 for use is modeling a spar. The test body 1 is composed of an outer sleeve 32 constructed to reproduce a detailed model of an actual spar and includes strakes 30 and various external appendages 31 added to represent the actual appendages (e.g. riser pipes, boat landings, mooring changes, fairleads and anodes) included on the full scale spar. Each respective side of the test body separated by the divider plate 2 is a mirror image of the other side and represents the portion of the floating spar that is submerged in the ocean during normal operation.

In using the testing apparatus and methodology discussed herein, one may prefer to use a test tank facility possessing the following capabilities. The depth of the tank may be chosen to be such that the body can be positioned 6 test body diameters from the top and bottom of the tank to minimize free surface and bottom boundary effects. The scale of the test body model and the carriage speed used may be chosen such that the tests can be carried out in the same general Reynolds number regime as the full-scale body.

For offshore platforms that normally operate in the super-critical Reynolds number regime, testing may also be conducted in the same regime. Methods that rely on predicting super-critical regime performance based upon sub-critical testing are believed to be inaccurate. For large diameter structures where it is not possible to test at full scale Reynolds number, the tow carriage may be chosen to be capable of testing to demonstrate Reynolds numbers independence in the same flow regime. Changing the spring stiffness for a given reduced-velocity enables running tests at significantly different Reynolds numbers in the same flow regime to check for Reynolds number dependence.

One method for predicting full-scale responses from model tests may be accomplished when conditions of similarity are satisfied. These conditions apply to both body geometry and flow dynamics. For separated flows, including VIV of circular cylinders, Reynolds number scaling may be used. Reynolds number ($R_n$) represents a ratio of fluid forces (inertia/friction). Conditions of similarity exist when the ratio of these forces is about the same at all geometrically similar points at all instances in time. For this condition to be true, strictly speaking, $R_n$ must be the same for the model and full scale.

Practical limitations with test facilities (power requirements, structural strength, cavitation, shallow-water wave effects) limit the ability to meet all conditions of similarity. In some situations, for example with DDCV's or spars, the best industry can do with model testing of offshore structures is to test at $R_n$ that are two orders of magnitude less than full scale, far short of the same $R_n$.

Methodology may be used where there are $R_n$ ranges where flows are dynamically similar and apply $R_n$ scaling within such ranges. For example, flows may be considered dynamically similar where the drag coefficient and Strouhal number (non-dimensional vortex shedding frequency for stationary cylinders) remain relatively constant. In these ranges, dynamically similar flows will produce similar VIV response and a representative test body may be tested at a lower $R_n$ to represent an offshore structure at a higher $R_n$ within a dynamically similar range. While we have not established the existence of a scientific law that guarantees the truth of this hypothesis, all of the data from our full-scale measurements on DDCV hulls and experimental tests on model-scale cylinders support this practice.

Figure 13:
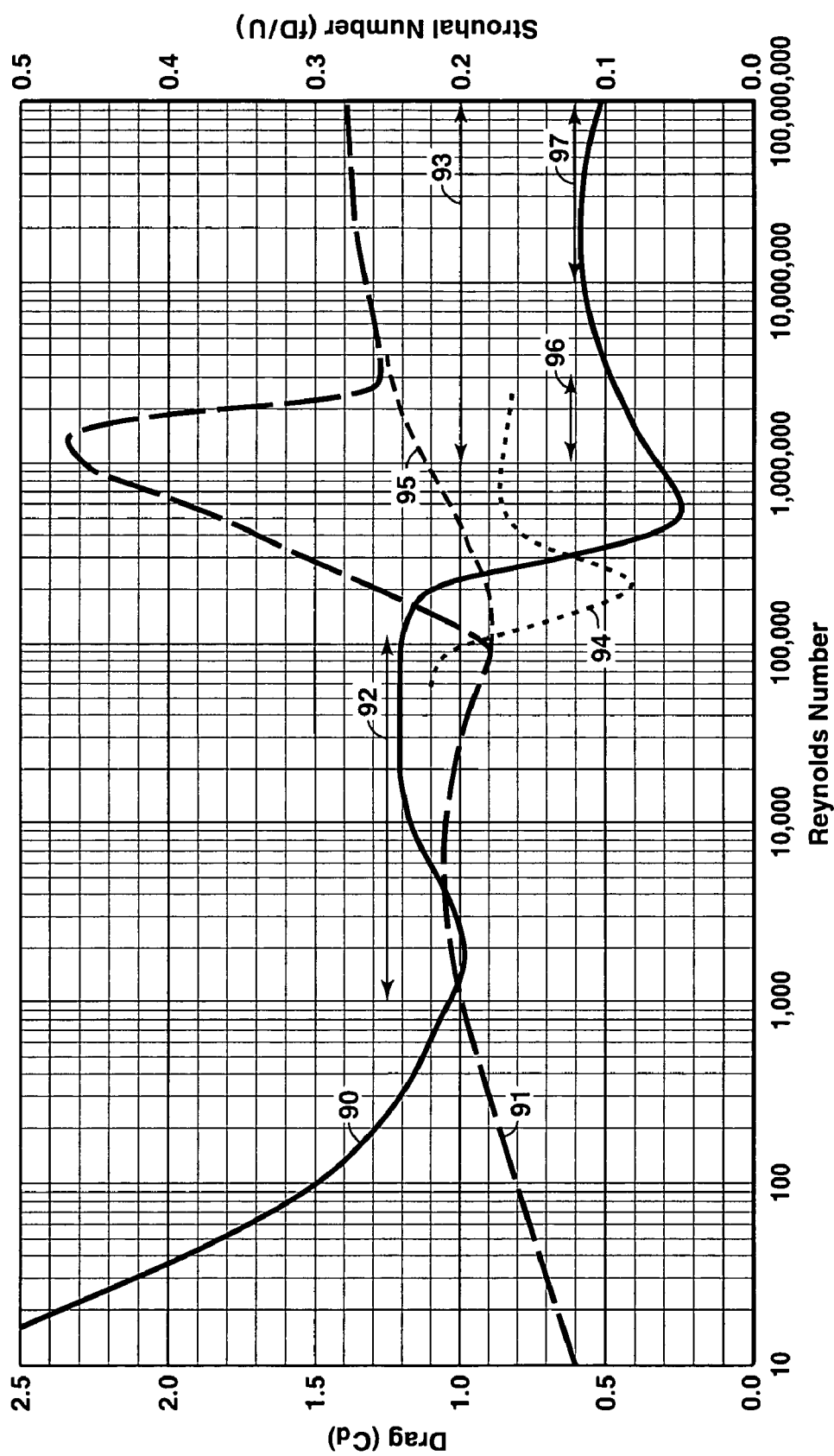
FIG. 13 depicts the relationship between drag, Strouhal number and Reynolds number for stationary cylinders.

FIG. 13 depicts the relationship between drag 90, Strouhal number 91 and Reynolds number for stationary cylinders. FIG. 13 shows two exemplary Reynolds number ranges that are dynamically similar, the sub-critical 92 and super-critical 93 regimes. Roughness may have an impact in the super-critical range as indicated with the dashed lines 94 and 95. It is preferable to ensure that the test models have sufficient roughness to represent the physical roughness encountered in the ocean. FIG. 13 also depicts the range in the super critical regime 93 where a testing facility is capable of operating 96 as compared to the range that an offshore structure might experience 97.

In the sub-critical regime, experiments on circular cylinders indicate key VIV related phenomenon remain invariant over the range of $R_n$. This data comes primarily from test data on risers and cylinders over a large range of Reynolds numbers in the sub-critical region. The wake or flow pattern behind the cylinder (width of wake, size, pattern and spacing of shed vortices, etc) remain nearly the same. The frequency of vortex shedding, f, on a fixed cylinder maintains a nearly constant relationship to flow speed U and cylinder diameter D: $f=S_t U/D$, where the Strouhal number $S_t$ is limited to a narrow range as shown in the FIG. 13. For spring-mounted cylinders, VIV occurs when the vortex shedding frequency roughly coincides with the cylinder's natural frequency, $f_n$. Furthermore, VIV occurs in a narrow range of reduced velocity $V_r$ of about 5 to 9 where $V_r=U/(f_n D)$. Maximum amplitude A/D remains nearly constant at ~1.0 for smooth cylinders. For fixed cylinders the drag coefficient $C_d$ remains nearly constant with $R_n$ as indicated above in the chart. For cylinders in VIV, test data show the drag characteristics are constant with Reynolds number for similar A/D motion and reduced velocity.

Figure 14:
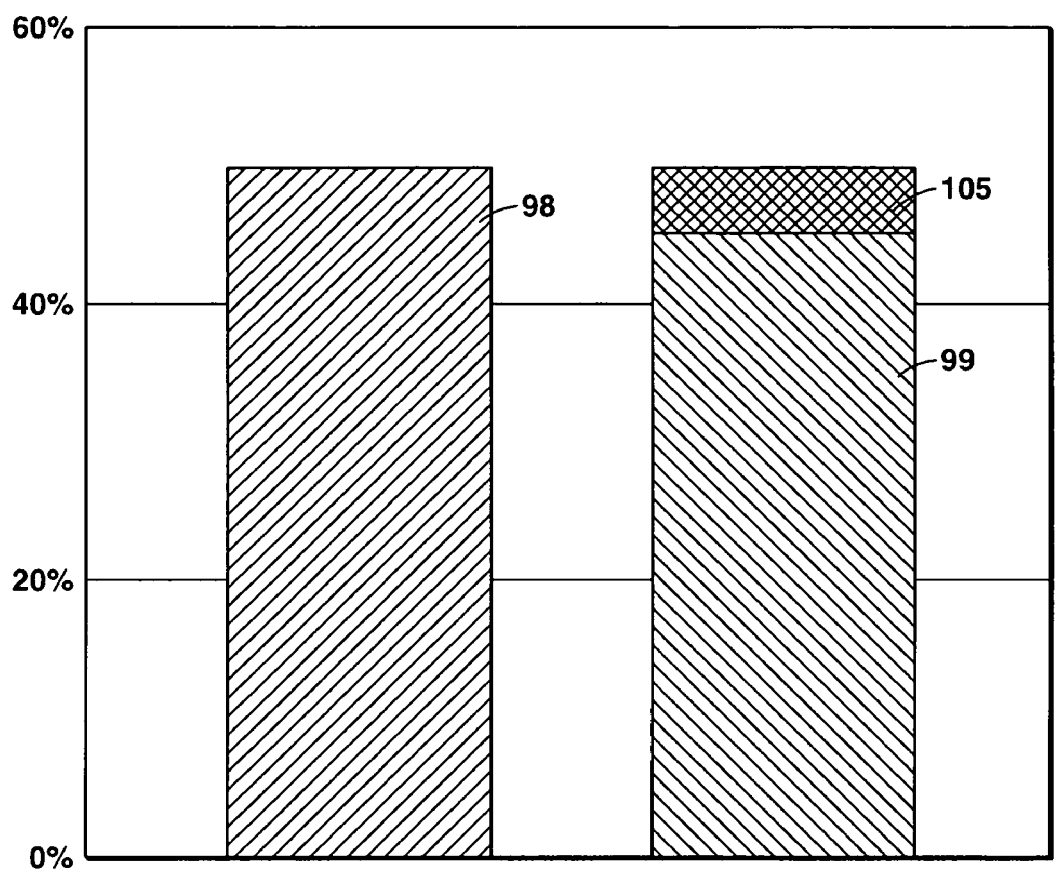
FIG. 14 depicts an A/D (VIV motion amplitude/characteristic diameter or cylinder diameter) response comparison of field observations and model tests.

In the supercritical regime, data for circular cylinders again show the following. The wake behind the cylinder remains nearly the same, although it is much narrower than the wake in the sub-critical regime. The Strouhal number remains nearly constant, although at a value higher than that for the sub-critical regime. Fixed cylinder drag coefficient $C_d$ remains nearly constant; and the value is less than that for the sub-critical regime. Over a small part of the supercritical region ($R_n$ range of 1 to $3\times10^6$), our model test data for DDCV spars consistently show invariant VIV response (amplitude, lock-in range, and drag) with respect to Reynolds number. To test at different Reynolds numbers and maintain constant reduced velocity, model sway stiffness/period and test speed may be varied. VIV responses (amplitude, lock-in range, and drag) over a larger range of the supercritical region are supportive, but not precise. FIG. 14 depicts an A/D (VIV motion amplitude/characteristic diameter or cylinder diameter) response comparison of field observations 98 and model tests 99. FIG. 14 shows a qualitatively favorable comparison between model tests at the lower end of the super-critical range 98 with field conditions at Reynolds numbers 2-3 orders of magnitude higher 99. None of the comparisons with field data from DDCV spars reveal clear evidence of contradictions or concerns with the scaling practice. The small differences that do exist can be accounted for by calculating impacts of the presence of wind and wave drift 105.

An alternative embodiment of the invention includes a method for testing fluid induced motions using a testing apparatus and the above described method of determining dynamically relatively constant flow regimes. The method may include determining a flow regime range that is dynamically relatively consistent within such flow regime range, for example the sub-critical or super-critical regime. The dynamically constant flow regime may be determined using a consistency measure. Examples of consistency measures include drag ($C_d$), Strouhal number, A/D, lift coefficient ($C_l$) or combinations of these measures. The consistent flow regime may therefore be defined where the consistency measure is relatively constant, for example where the chosen consistency measure varies by less than 50% or alternatively less than 40%, 30%, 25%, 20% or 10%.

The method may include determining at least one Reynolds number within the defined flow regime range expected to be experienced by an offshore structure while in a body of water. This may optionally be a Reynolds number that is too high to be modeled using conventional water testing facilities. For example, many testing facilities are only capable of testing at Reynolds numbers below 5,000,000 while others are capable of testing at Reynolds numbers below 3,000,000, 1,000,000, 500,000 or 300,000. Alternatively, the testing may be accomplished at Reynolds numbers between 200,000 to 5,000,000 or 600,000 to 4,000,000 or 800,000 to 4,000,000. Conversely many large offshore structures, for example DDCV's and spars, experience Reynolds numbers in excess of 5,000,000 while others experience Reynolds numbers in excess of 10,000,000, 50,000,000, 70,000,000, 80,000,000 or more. The method includes determining a second Reynolds number within the flow regime range that is suitable for testing fluid induced motions using the testing apparatus, the second Reynolds may number differ from the at least one Reynolds number expected to be experienced by an offshore structure. The method includes testing a test body that is representative of the offshore structure of interest at a Reynolds number which approximates the second Reynolds number that is suitable for testing fluid induced motions using the testing apparatus.

For structures such as risers that can experience flows in multiple Reynolds number regimes, the test tank may be chosen to possess capabilities to cover such a range. The capability to fit the testing apparatus with a wide range of springs expands the choice of model scales and tow carriages to enable testing at Reynolds numbers over flow regimes of interest.

The testing apparatus and methodologies described herein may be used to design, evaluate and construct offshore structures for use in exploring for and producing offshore hydrocarbon resources. The offshore structure may be for example a classic spar (e.g. a deep draft caisson vessel ("DDCV") or a truss spar) that is equipped with a deck or a production or export riser. In the case of the spar, the deck can support offshore hydrocarbon resource (i.e. oil and gas) exploration, drilling and production operations. The deck may be use to conduct offshore seismic data collection. Alternatively, the deck can support offshore drilling equipment for oil and/or gas drilling operations. The deck may also support oil and/or gas production equipment for the production of oil and gas natural resources. Produced oil and/or gas may then be off-loaded from the deck by, for example, pipeline to shore or a transport ship or barge and then moved to shore. The oil and gas may then be refined into usable petroleum products such as, for example, natural gas, liquefied petroleum gas, gasoline, jet fuel, diesel fuel, heating oil or other petroleum products.

EXAMPLES

Figure 7:
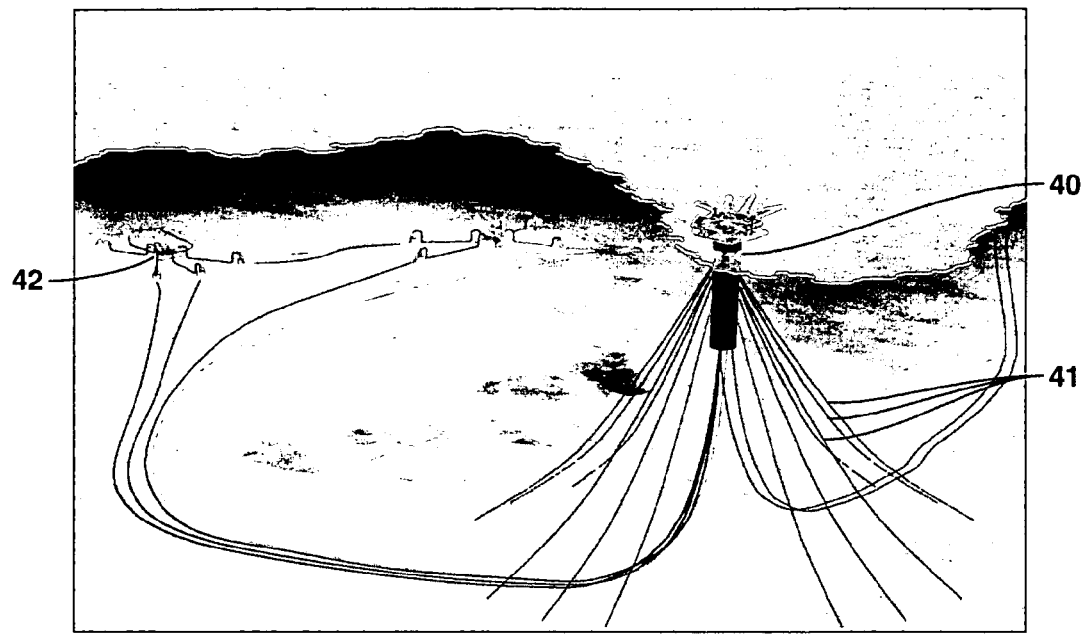
FIG. 7 illustrates a production spar.

Embodiments of the testing apparatus described herein provide a significant improvement over other test rigs used by the offshore industry. Examples using embodiments of the invention described herein are included below. FIG. 7 shows a schematic of a production spar 40 as it appears in the field, including a depiction of its mooring lines 41 and subsea well heads 42. When currents are high the entire floating platform becomes subject to large oscillating motions. Such motions are important to the design of the mooring lines that hold the structure in place. The motions also influence design of the production risers, which are pipes bringing production fluids from the seafloor to the structure, and export risers, which are pipes bringing oil and gas from the structure to seafloor pipelines which deliver the product to onshore receiving terminals.

In the first example, a test rig corresponding to the test rig depicted in FIG. 1, including a three turbulence bar arrangement of FIG. 11, was used to reproduce current-induced VIV motions observed at two floating production spars in the Gulf of Mexico using horizontal double test bodies with a divider plate of the type depicted in FIG. 5. This first testing apparatus will be referred to in this and the following example as Test Apparatus 1. The testing using the above described Test Apparatus 1 was contrasted against a second testing apparatus (Test Apparatus 2) which did not include 1) a test body which included a rotatable outer sleeve, 2) an actuator, and 3) a three turbulence bar turbulence screen arrangement.

Figure 8:
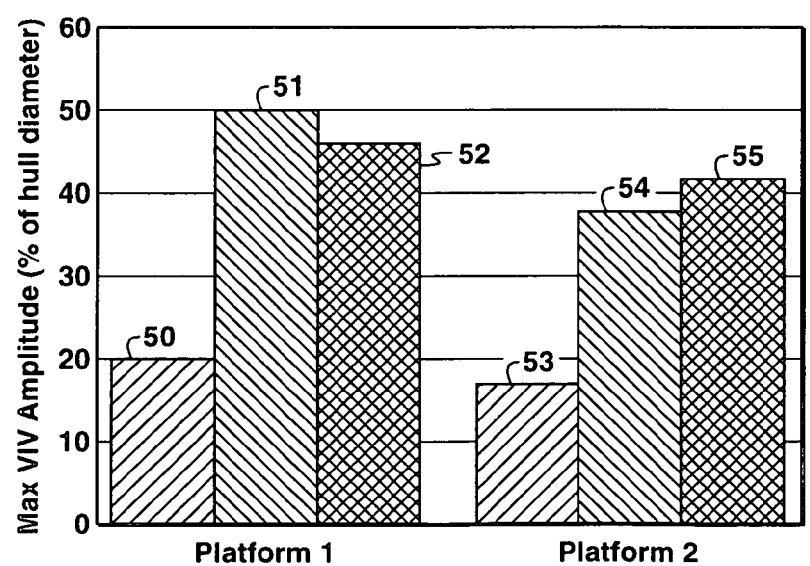
FIG. 8 illustrates a comparison of current induced VIV amplitudes.

The above-described testing apparatus were secured to a tow carriage and dragged through a 2000 ft×20 ft×16 ft water test tank. The test body was submerged at least 6 test body diameters below the test tank surface while remaining at least 6 test body diameters from the test tank's bottom surface. The test body was tested at velocities ranging from 0.5 to 12 knots and at Reynolds numbers of from $1\times10^5$ to $2\times10^6$. The test body's outer sleeve was also rotated at 15 degree increments to establish the maximum VIV amplitude FIG. 8 is a gross comparison of motion predictions using Test Apparatus 2 which did not include any actuators to compensate for the mechanical damping and Test Apparatus 1 depicted in FIG. 1 against actual field measurements of two offshore production facilities. For Platform 1 on Test Apparatus 2, the maximum VIV amplitude 50 is less than half of the field observations 51. The data obtained using the improved Test Apparatus 2 and methodology described herein is represented by 52. For Platform 2 on Test Apparatus 2, the maximum VIV amplitude 53 is less than half of the field observations 54. The data obtained using Test Apparatus 1 and methodology described herein is represented by 55. As FIG. 8 displays the maximum A/D measured using Test Apparatus 2 was only 0.2 rather than 0.5 for Test Apparatus 1 depicted in FIG. 1. The data demonstrates that testing using Test Apparatus 2 underestimated VIV motions.

In the second example, the testing apparatus described as Test Apparatus 1 in the previous example was used to predict the VIV effects of a non-uniform test body of the type depicted in FIG. 5. There is currently no known prior art analytical methodology useful for accurately predicting the VIV effects, including the heading dependence, of complex surface appurtenances, such as mooring hardware, pipes and strake cut-outs, located on offshore structures. Using embodiments of the testing apparatus described herein however, such behavior may be accurately predicted.

In this example a horizontal double test body with a divider plate was tested at 10-degree increments by rotating the test body sleeve around the inner core of the test body. The above-described test rig was secured to a tow carriage and dragged through a 2000 ft×20 ft×16 ft water test tank. The test body was submerged at least 6 test body diameters below the test tank surface while remaining at least 6 test body diameters from the test tank's bottom surface. The test body was tested at velocities ranging from 0.5 to 12 knots and at Reynolds numbers of from $1\times10^5$ to $2\times10^6$.

Figure 9:
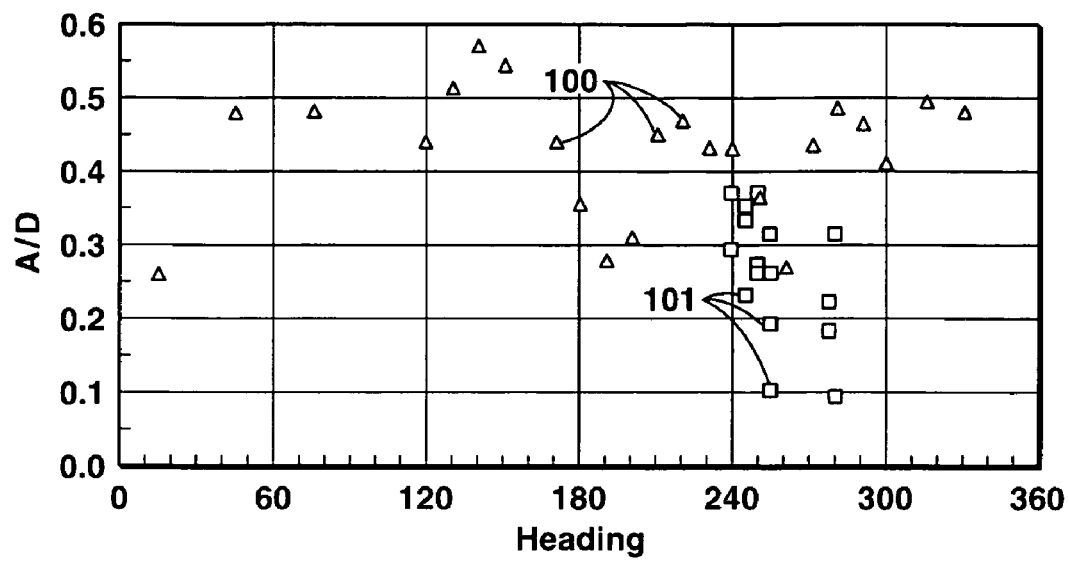
FIG. 9 illustrates a comparison of predicted and observed VIV amplitude.
Figure 10:
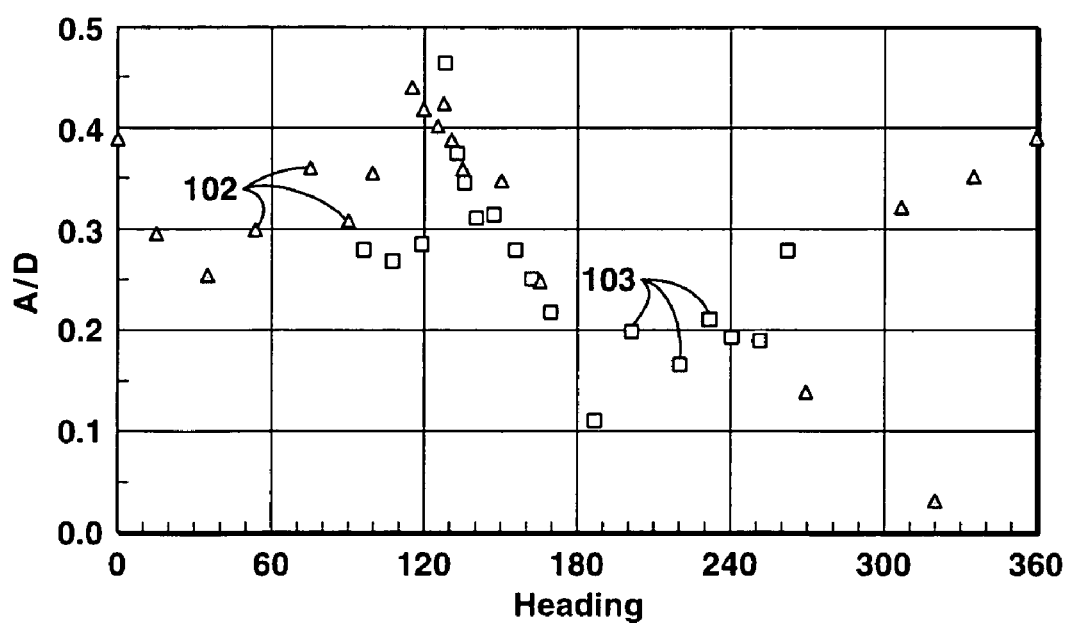
FIG. 10 illustrates a comparison of predicted and observed VIV amplitude.

FIG. 9 shows the response versus direction for Platform No. 2 in the Gulf of Mexico. In FIG. 9 the model test date obtained using Test Apparatus 1 is depicted by triangles 100 while the observed field data for the actual platform is depicted by squares 101. FIG. 10 shows the response versus direction for Platform No. 1 in the Gulf of Mexico. In FIG. 10 the model test date obtained using Test Apparatus 1 is depicted by triangles 102 while the observed field data for the actual platform is depicted by squares 103. To date field data has only been collected for a limited number of current directions, however the data does indicate that the directional sensitivity observed in the lab using the testing apparatus described herein is consistent with field measurements.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

The present invention has been described in connection with its preferred embodiments. However, to the extent that the foregoing description is specific to a particular embodiment or a particular use of the invention, this is intended to be illustrative only and is not to be construed as limiting the scope of the invention. On the contrary, it is intended to cover all alternatives, modifications, and equivalents that are included within the spirit and scope of the invention, as defined by the appended claims.

We claim:

1. A vortex induced vibration motion testing apparatus comprising a test rig suitable for holding a horizontal test body in a water body, wherein said testing apparatus comprises:

an actuator suitable for producing a force upon the test body, said actuator using a feedback control mechanism, wherein a damping model is used in said feedback control mechanism;

a turbulence generator located in the water body up current from the test body suitable for generating a turbulent flow field with uniform turbulence intensity across the water body-test body interface, the turbulent flow field including dominate vortical structures, the axis of the vortical structures about parallel to the longitudinal axis of the test body; and a test body adjuster suitable for adjusting the test body relative to the water current in four or more increments, thereby enabling multiple headings of the test body to be tested against the current of the water body.

2. The testing apparatus according to claim 1, wherein the actuator is capable of producing a force in a direction perpendicular to the direction of the water current acting upon the test body.

3. The testing apparatus according to claim 2, further including an actuation force measurement device suitable for measuring the force applied by the actuator upon the test body.

4. The testing apparatus according to claim 2, further including a push-pull assembly suitable for transferring force from an actuator to the test body.

5. The testing apparatus according to claim 4, further including a spring in communication with the push-pull assembly, thereby enabling the spring to absorb at least a portion of the force induced in the test body from movement in the water body.

6. The testing apparatus according to claim 5, wherein the push-pull assembly further includes a test body force measurement device suitable for measuring force transferred from the test body to the test rig.

7. The testing apparatus according to claim 5, wherein the push-pull assembly includes a push-pull rod in communication with a car, the push-pull rod in communication with the test body, the push-pull rod thereby communicating forces induced in the test body from movement of the test body in the water body to the car, the car in communication with the spring thereby providing dampening of the forces induced in the test body from movement of the test body in the water body.

8. The testing apparatus according to claim 2, further including a vertical motion sensor.

9. The testing apparatus according to claim 8, further including an actuator control system.

10. The testing apparatus according to claim 9, wherein said actuator control system is a digital control system.

11. The testing apparatus according to claim 10, wherein said actuator control system includes control logic selected from Coulomb damping logic, linear damping logic, quadratic damping logic, and combinations thereof.

12. The testing apparatus according to claim 1, wherein said one or more element(s) is a turbulence generator located in the water body up current from the test body suitable for generating a turbulent flow field with uniform turbulence intensity across the water body-test body interface, the turbulent flow field including dominate vortical structures, the axis of the vortical structures about parallel to the longitudinal axis of the test body.

13. The testing apparatus according to claim 12, wherein the turbulence generator includes a plurality of bars positioned upstream of the test body.

14. The testing apparatus according to claim 13, wherein the test body is a horizontal test body and the plurality of bars are disposed horizontally.

15. The testing apparatus according to claim 14, wherein the turbulence generator includes one larger diameter bar up current of two smaller diameter bars.

16. The testing apparatus according to claim 15, wherein the larger diameter bar has a diameter of from 1.2 to 1.8 times of the diameter of the two smaller diameter bars.

17. The testing apparatus according to claim 1, wherein said one or more element(s) is a test body adjuster suitable for adjusting the test body relative to the water current in four or more increments, thereby enabling multiple headings of the test body to be tested against the current of the water body.

18. The testing apparatus according to claim 17, wherein the test body adjuster comprises an outer sleeve rotatably movable upon the test body.

19. The testing apparatus according to claim 18, wherein the test body adjuster is capable of adjusting the test body relative to the water current in 8 or more increments.

20. The testing apparatus according to claim 19, wherein the test body adjuster is capable of adjusting the test body relative to the water current in twelve or more increments.

21. The testing apparatus according to claim 1, further including a horizontal double test body separated by a divider plate, each respective side of said test body fabricated to represent a structure to be tested.

22. The testing apparatus according to claim 1, further including a vertical displacement equalization system suitable for equalizing the rotational force which may be induced in the test body perpendicular to the water current.

23. The testing apparatus according to claim 1, further including a non-linear spring system suitable for absorbing at least a portion of the forces imparted to the test body in a direction perpendicular to the water current.

24. The testing apparatus according to claim 1, further including a towing mechanism suitable for transferring movement from a means of propulsion to the test body thereby moving the test body relative to the water body, said towing mechanism including a towing strut pivotally connected to a towing rod, said towing rod connected to said test body, said towing strut connected to said means of propulsion, said towing mechanism thereby providing a means for movement of said test body in a direction perpendicular to the water current.

25. The testing apparatus according to claim 2, further including a horizontal double test body separated by a divider plate, each respective side of said test body fabricated to represent a structure to be tested.

26. The testing apparatus according to claim 2, further including a vertical displacement equalization system suitable for equalizing the rotational force which may be induced in the test body perpendicular to the water current.

27. The testing apparatus according to claim 2, further including a non-linear spring system suitable for absorbing at least a portion of the forces imparted to the test body in a direction perpendicular to the water current.

28. The testing apparatus according to claim 2, further including a towing mechanism suitable for transferring movement from a means of propulsion to the test body thereby moving the test body relative to the water body, said towing mechanism including a towing strut pivotally connected to a towing rod, said towing rod connected to said test body, said towing strut connected to said means of propulsion, said towing mechanism thereby providing a means for movement of said test body in a direction perpendicular to the water current.

29. A method for testing vortex induced vibration motions using a testing apparatus according to claim 1, 12, or 17, comprising:
  a) providing a water body comprising water;
  b) attaching a test body to a test rig of the testing apparatus;
  c) submerging the test body at least partially in the water body; and
  d) moving the test body, the water, or both thereby creating relative movement between the test body and the water.

30. The method of claim 29, further including:
  e) measuring at least one aspect of the test body's movement in the water.

31. The method of claim 30, wherein said test body is a model of an offshore structure.

32. The method of claim 31, further comprising:
  f) designing a full scale offshore structure using the measurement obtained in step e.

33. The method according to claim 32, further comprising:
  g) constructing an offshore structure based upon the design obtained in step f.

34. The method according to claim 33, wherein the offshore structure is a DDCV, truss spar, drilling riser, production riser, pipeline, drilling vessel, production vessel or subsea well.

35. The method according to claim 34, further comprising:
  h) producing offshore hydrocarbon resources using the offshore structure.

36. The method of claim 34, further comprising:
  i) transporting the hydrocarbon resources to shore.

37. A vortex induced vibration motion testing apparatus, comprising:
  a) a test body;
  b) a test rig suitable for holding the test body in a water body;
  c) an actuator suitable for producing a force upon the test body, said actuator using a feedback control mechanism, wherein a damping model is used in said feedback control mechanism, and wherein the actuator is capable of producing a force in a direction perpendicular to the direction of a water current acting upon the test body;
  d) a turbulence generator located in the water body up current from the test body suitable for generating a turbulent flow field with uniform turbulence intensity across the water body-test body interface, the turbulent flow field including dominate vortical structures, the axis of the vortical structures about parallel to the longitudinal axis of the test body; and e) a test body adjuster suitable for adjusting the test body relative to the water current in four or more increments, thereby enabling multiple headings of the test body to be tested against the current of the water body.

38. The testing apparatus according to claim 37, further including an actuation force measurement device suitable for measuring the force applied by the actuator upon the test body.

39. The testing apparatus according to claim 38, further including a push-pull assembly suitable for transferring force from an actuator to the test body.

40. The testing apparatus according to claim 38, further including a spring in communication with the push-pull assembly, thereby enabling the spring to absorb at least a portion of the force induced in the test body from movement in the water body.

41. The testing apparatus according to claim 39, wherein the push-pull assembly further includes a test body force measurement device suitable for measuring force transferred from the test body to the test rig.

42. The testing apparatus according to claim 41, wherein the push-pull assembly includes a push-pull rod in communication with a car, the push-pull rod in communication with the test body, the push-pull rod thereby communicating forces induced in the test body from movement of the test body in the water body to the car, the car in communication with the spring thereby providing dampening of the forces induced in the test body from movement of the test body in the water body.

43. The testing apparatus according to claim 37, further including a vertical motion sensor.

44. The testing apparatus according to claim 43, further including an actuator control system.

45. The testing apparatus according to claim 44, wherein said actuator control system includes control logic selected from Coulomb damping logic, linear damping logic, quadratic damping logic, and combinations thereof.

46. The testing apparatus according to claim 37, wherein the one or more elements is a turbulence generator located in the water body up current from the test body suitable for generating a turbulent flow field with uniform turbulence intensity across the water body-test body interface, the turbulent flow field including dominate vortical structures, the axis of the vortical structures about parallel to the longitudinal axis of the test body.

47. The testing apparatus according to claim 46, wherein the turbulence generator includes a plurality of bars positioned upstream of the test body.

48. The testing apparatus according to claim 47, wherein the test body is a horizontal test body and the plurality of bars are disposed horizontally.

49. The testing apparatus according to claim 48, wherein the turbulence generator includes one larger diameter bar up current of two smaller diameter bars.

50. The testing apparatus according to claim 49, wherein the larger diameter bar has a diameter of from 1.2 to 1.8 times of the diameter of the two smaller diameter bars.

51. The testing apparatus according to claim 37, wherein the one or more elements is a test body adjuster suitable for adjusting the test body relative to the water current in four or more increments, thereby enabling multiple headings of the test body to be tested against the current of the water body.

52. The testing apparatus according to claim 51, wherein the test body adjuster comprises an outer sleeve rotatably movable upon the test body.

53. The testing apparatus according to claim 52, wherein the test body adjuster is capable of adjusting the test body relative to the water current in 8 or more increments.

54. The testing apparatus according to claim 53, wherein the test body adjuster is capable of adjusting the test body relative to the water current in twelve or more increments.

55. The testing apparatus according to claim 37, further including a vertical displacement equalization system suitable for equalizing the rotational force which may be induced in the test body perpendicular to the water current.

56. The testing apparatus according to claim 37, further including a non-linear spring system suitable for absorbing at least a portion of the forces imparted to the test body in a direction perpendicular to the water current.

57. The testing apparatus according to claim 37, further including a towing mechanism suitable for transferring movement from a means of propulsion to the lest body thereby moving the test body relative to the water body, said towing mechanism including a towing strut pivotally connected to a towing rod, said towing rod connected to said test body, said towing strut connected to said means of propulsion, said towing mechanism thereby providing a means for movement of said test body in a direction perpendicular to the water current.

58. The testing apparatus according to claim 37, further including a horizontal double test body separated by a divider plate, each respective side of said test body fabricated to represent a structure to be tested.

59. The testing apparatus according to claim 37, further including a vertical displacement equalization system suitable for equalizing the rotational force which may be induced in the test body perpendicular to the water current.

60. The testing apparatus according to claim 37, further including a non-linear spring system suitable for absorbing at least a portion of the forces imparted to the test body in a direction perpendicular to the water current.

61. The testing apparatus according to claim 37, further including a towing mechanism suitable for transferring movement from a means of propulsion to the test body thereby moving the test body relative to the water body, said towing mechanism including a towing strut pivotally connected to a towing rod, said towing rod connected to said test body, said towing strut connected to said means of propulsion, said towing mechanism thereby providing a means for movement of said test body in a direction perpendicular to the water current.

62. A method for testing vortex induced vibration motions in water using a testing apparatus, comprising:
  a) determining a supercritical flow regime range that is dynamically relatively consistent within said flow regime range, comprising:
    (i) determining a consistency measure selected from drag ($C_d$), Strouhal number, A/D, life coefficient ($C_l$) or combinations thereof; and
    (ii) defining said flow regime to exist where said consistency measure is relatively constant; and
  b) determining at least one Reynolds number within said supercritical flow regime range expected to be experienced by an offshore structure while in a body of water;
  c) providing a water body comprising water;
  d) providing a test body, said test body being representative of said offshore structure;
  e) providing a testing apparatus including a test rig suitable for holding said test body;

f) attaching said test body to said test rig of the testing apparatus;

g) determining a second Reynolds number within said supercritical flow regime range that is suitable for testing vortex induced vibration motions using said testing apparatus, said second Reynolds number differing from said at least one Reynolds number;

h) submerging said test body at least partially in said water body; and i) moving the test body, the water, or both thereby creating relative movement between said test body and said water wherein said relative movement between said test body and said water approximates said second Reynolds number.

63. The method according to claim 62, wherein said consistency measure is relatively constant where said consistency measure varies by less than 40%.

64. The method according to claim 62, wherein said consistency measure is relatively constant where said consistency measure varies by less than 25%.

65. The method according to claim 64, wherein said consistency measure includes both said A/D.

66. The method according to claim 64, wherein said at least one Reynolds number is greater than 6,000,000 and said second Reynolds number is less than 5,000,000.

67. The method according to claim 66, wherein said at least one Reynolds number is greater than 20,000,000 and said second Reynolds number is between 800,000 and 4,000,000.

68. A method for testing vortex induced vibration motions using a testing apparatus according to claim 1, comprising:
   a) providing a water body comprising water;
   b) attaching a test body to a test rig of the testing apparatus;
   c) submerging the test body at least partially in the water body; and
   d) moving the test body, the water, or both thereby creating relative movement between the test body and the water.

69. The method according to claim 62, wherein said testing apparatus is the testing apparatus of claim 1.

70. The testing apparatus according to claim 1, further comprising a track and car assembly.

* * * * *